(12) United States Patent
Zhou et al.

(10) Patent No.: US 12,207,245 B2
(45) Date of Patent: Jan. 21, 2025

(54) PACKET EXPIRY INFORMATION SIGNALING FOR SIDELINK COMMUNICATIONS

(71) Applicant: QUALCOMM Incorporated, San Diego, CA (US)

(72) Inventors: Shanyu Zhou, San Diego, CA (US); Arumugam Chendamarai Kannan, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 567 days.

(21) Appl. No.: 17/644,384

(22) Filed: Dec. 15, 2021

(65) Prior Publication Data

US 2023/0189249 A1 Jun. 15, 2023

(51) Int. Cl.
*H04W 72/12* (2023.01)
*H04W 72/21* (2023.01)
*H04W 72/23* (2023.01)

(52) U.S. Cl.
CPC ....... *H04W 72/1221* (2013.01); *H04W 72/21* (2023.01); *H04W 72/23* (2023.01)

(58) Field of Classification Search
CPC . H04W 72/21; H04W 72/1221; H04W 72/23; H04W 72/40; H04W 72/25; H04W 72/04; H04L 5/0035; H04L 5/0055; H04L 5/0057; H04L 12/2869; H04L 12/5695; H04L 47/00; H04L 47/70; H04L 47/78; H04L 47/821; H04L 47/827
See application file for complete search history.

(56) References Cited

U.S. PATENT DOCUMENTS

| | | | | |
|---|---|---|---|---|
| 10,952,266 B2* | 3/2021 | Hahn | ...................... | H04W 4/40 |
| 11,229,042 B2* | 1/2022 | Ganesan | .................... | H04L 1/08 |
| 2023/0115633 A1* | 4/2023 | Park | .................. | H04W 72/0446 370/311 |
| 2023/0164768 A1* | 5/2023 | Park | ...................... | H04W 76/28 370/329 |
| 2023/0208563 A1* | 6/2023 | Liang | .................... | H04L 1/1848 370/311 |

* cited by examiner

*Primary Examiner* — Jung Liu
(74) *Attorney, Agent, or Firm* — Harrity & Harrity, LLP

(57) ABSTRACT

Various aspects of the present disclosure generally relate to wireless communication. In some aspects, a transmitter user equipment (UE) may obtain timing information that indicates an expiration time for transmitting a plurality of packets to a receiver UE. The transmitter UE may transmit a sidelink communication to the receiver UE, in accordance with the timing information, that includes at least one packet of the plurality of packets. Numerous other aspects are described.

30 Claims, 11 Drawing Sheets

PACKET EXPIRY INFORMATION SIGNALING FOR SIDELINK COMMUNICATIONS

FIELD OF THE DISCLOSURE

Aspects of the present disclosure generally relate to wireless communication and to techniques and apparatuses for packet expiry information signaling for sidelink communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a transmitter user equipment (UE). The method may include obtaining timing information that indicates an expiration time for transmitting a plurality of packets to a receiver UE. The method may include transmitting a sidelink communication to the receiver UE, in accordance with the timing information, that includes at least one packet of the plurality of packets.

Some aspects described herein relate to a method of wireless communication performed by a receiver UE. The method may include obtaining timing information that indicates an expiration time for receiving a plurality of packets from a transmitter UE. The method may include transmitting an indication of the timing information.

Some aspects described herein relate to an apparatus for wireless communication performed by a transmitter UE. The apparatus may include a memory and one or more processors, coupled to the memory. The one or more processors may be configured to obtain timing information that indicates an expiration time for transmitting a plurality of packets to a receiver UE. The one or more processors may be configured to transmit a sidelink communication to the receiver UE, in accordance with the timing information, that includes at least one packet of the plurality of packets.

Some aspects described herein relate to an apparatus for wireless communication performed by a receiver UE. The apparatus may include a memory and one or more processors, coupled to the memory. The one or more processors may be configured to obtain timing information that indicates an expiration time for receiving a plurality of packets from a transmitter UE. The one or more processors may be configured to transmit an indication of the timing information.

Some aspects described herein relate to a non-transitory computer-readable medium that stores a set of instructions for wireless communication by a transmitter UE. The set of instructions, when executed by one or more processors of the UE, may cause the UE to obtain timing information that indicates an expiration time for transmitting a plurality of packets to a receiver UE. The set of instructions, when executed by one or more processors of the UE, may cause the UE to transmit a sidelink communication to the receiver UE, in accordance with the timing information, that includes at least one packet of the plurality of packets.

Some aspects described herein relate to a non-transitory computer-readable medium that stores a set of instructions for wireless communication by a receiver UE. The set of instructions, when executed by one or more processors of the UE, may cause the UE to obtain timing information that indicates an expiration time for receiving a plurality of packets from a transmitter UE. The set of instructions, when executed by one or more processors of the UE, may cause the UE to transmit an indication of the timing information.

Some aspects described herein relate to an apparatus for wireless communication. The apparatus may include means for obtaining timing information that indicates an expiration time for transmitting a plurality of packets to a receiver UE. The apparatus may include means for transmitting a sidelink communication to the receiver UE, in accordance with the timing information, that includes at least one packet of the plurality of packets.

Some aspects described herein relate to an apparatus for wireless communication. The apparatus may include means for obtaining timing information that indicates an expiration time for receiving a plurality of packets from a transmitter UE. The apparatus may include means for transmitting an indication of the timing information.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
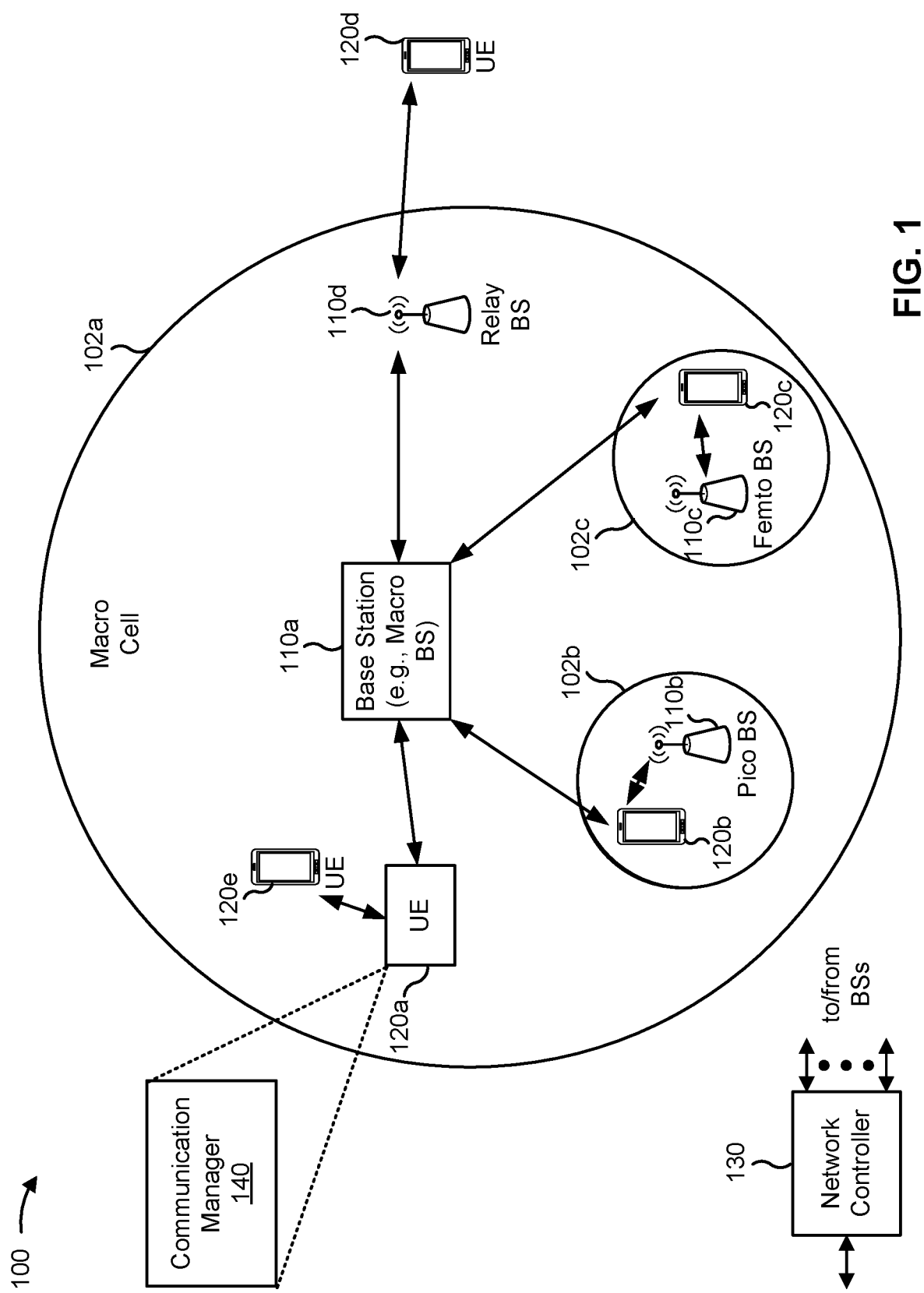
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a transmitter UE (e.g., the transmitter UE 605 depicted in FIG. 6) may include a communication manager 140. As described in more detail elsewhere herein, the communication manager 140 may obtain timing information that indicates an expiration time for transmitting a plurality of packets to a receiver UE; and transmit a sidelink communication to the receiver UE, in accordance with the timing information, that includes at least one packet of the plurality of packets. Additionally, or alternatively, the communication manager 140 may perform one or more other operations described herein.

In some aspects, the receiver UE (e.g., the receiver UE 610) may include a communication manager 140. As described in more detail elsewhere herein, the communication manager 140 may obtain timing information that indicates an expiration time for receiving a plurality of packets from a transmitter UE; and transmit an indication of the timing information. Additionally, or alternatively, the communication manager 140 may perform one or more other operations described herein.

As indicated above, FIG. 1 is provided as an example. Other examples may differ from what is described with regard to FIG. 1.

Figure 2:
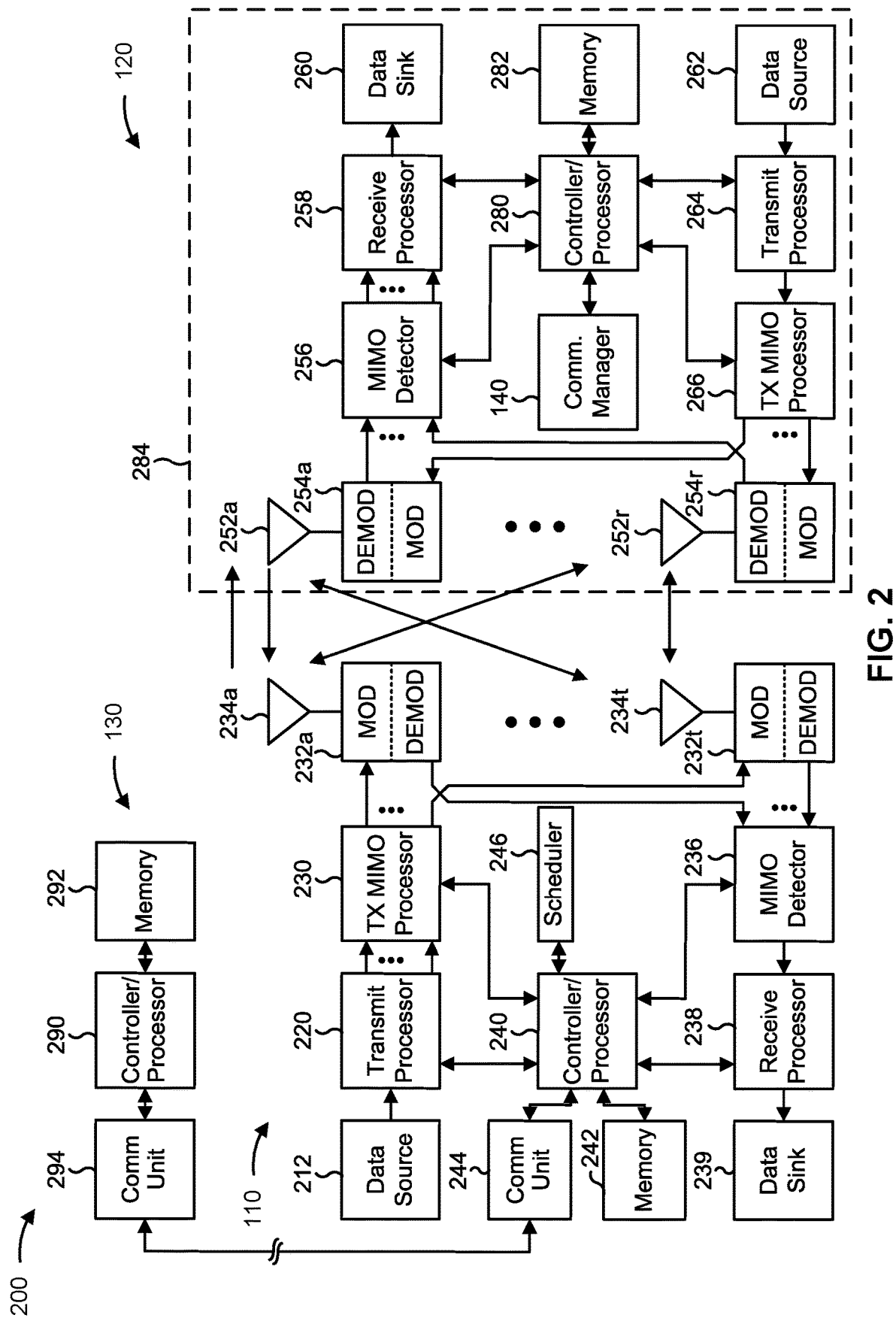
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode)

the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the base station 110, the controller/processor 280 of the UE 120, and/or any other component(s) of FIG. 2 may perform one or more techniques associated with packet expiry information signaling for sidelink communications, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a transmitter UE (e.g., the transmitter UE 605) includes means for obtaining timing information that indicates an expiration time for transmitting a plurality of packets to a receiver UE; and/or means for transmitting a sidelink communication to the receiver UE, in accordance with the timing information, that includes at least one packet of the plurality of packets. The means for the transmitter UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a receiver UE (e.g., the receiver UE 610) includes means for obtaining timing information that indicates an expiration time for receiving a plurality of packets from a transmitter UE; and/or means for transmitting an indication of the timing information. The means for the receiver UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
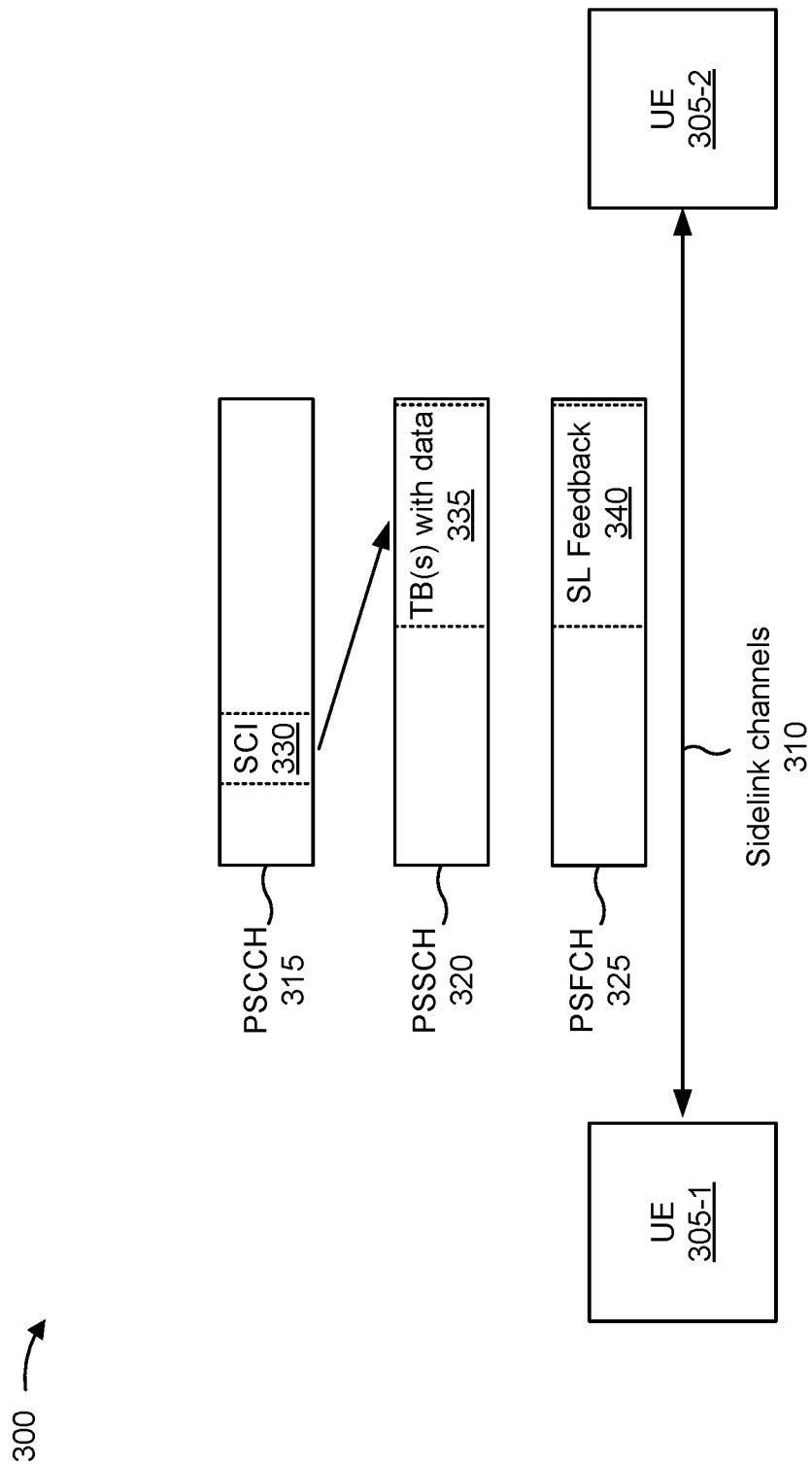
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As described in more detail below, a transmitter UE (e.g., the UE 305-1) may obtain timing information for transmitting a plurality of packets to a receiver UE (e.g., the UE 305-2), and may transmit one or more packets, of the plurality of packets, using the sidelink channels 310, in accordance with the timing information.

As indicated above, FIG. 3 is provided as an example. Other examples may differ from what is described with respect to FIG. 3.

Figure 4:
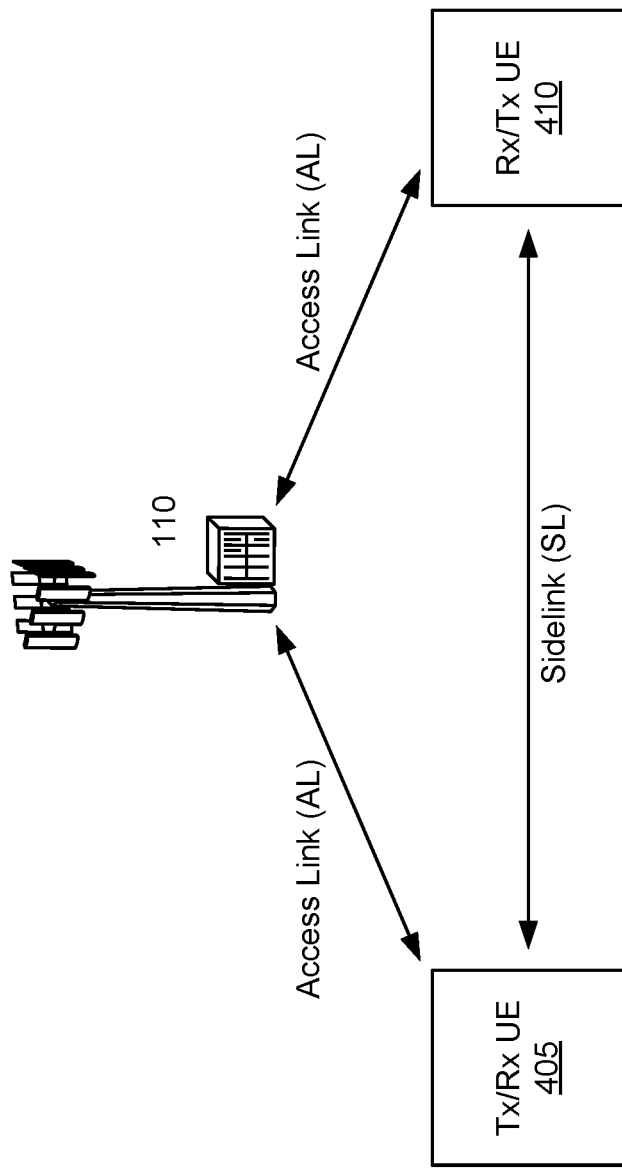
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As described in more detail below, a transmitter UE (e.g., the UE 405) may obtain timing information for transmitting a plurality of packets to a receiver UE (e.g., the UE 410), and may transmit one or more packets, of the plurality of packets, in accordance with the timing information.

As indicated above, FIG. 4 is provided as an example. Other examples may differ from what is described with respect to FIG. 4.

Figure 5:
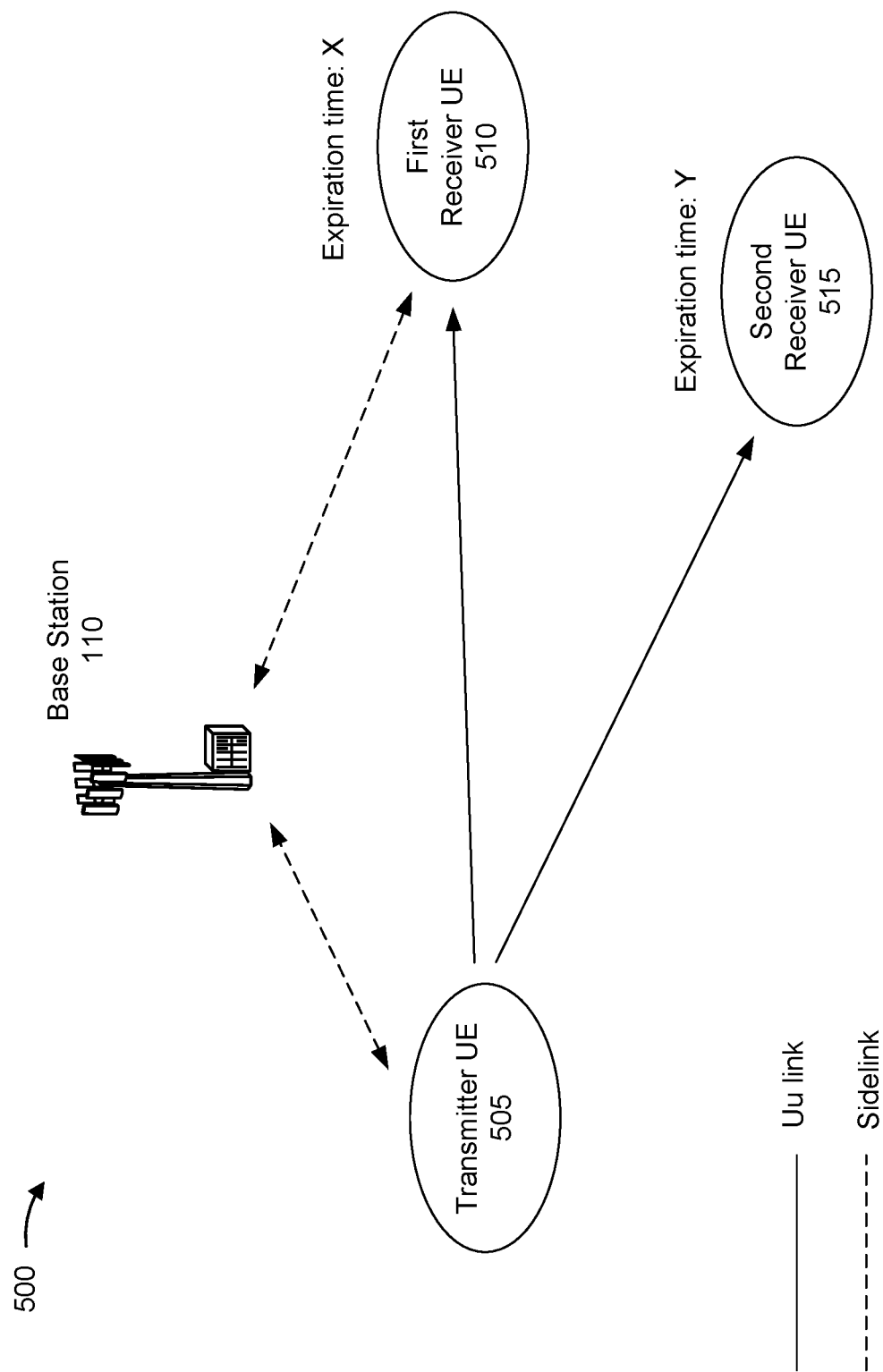
FIG. 5 is a diagram illustrating an example of packet transmissions, in accordance with the present disclosure.

FIG. 5 is a diagram illustrating an example 500 of packet transmissions, in accordance with the present disclosure. A transmitter UE, such as the transmitter UE 505, may communicate with a base station, such as the base station 110. The transmitter UE 505 may communicate with one or more receiver UEs, such as the first receiver UE 510 and the second receiver UE 515. In some cases, the communications between the transmitter UE 505, the first receiver UE 510, and the second receiver UE 515 may be sidelink communications. While the UEs are described as transmitter UEs and receiver UEs, any of the UEs described herein may be configured to transmit and receive information. For example, the transmitter UE 505, the first receiver UE 510, and/or the second receiver UE 515 may include some or all of the features of the UE 120.

In some cases, the transmitter UE 505 may be configured to transmit, and the first receiver UE 510 may be configured to receive, a first set of packets. The first receiver UE 510 may be scheduled to receive the first set of packets prior to a first expiration time (e.g., time X). For example, at least some of the packets of the first set of packets may expire (e.g., may be dropped) if those packets are not received prior to the first expiration time X.

In some cases, the transmitter UE 505 may be configured to transmit, and the second receiver UE 515 may be configured to receive, a second set of packets. The second receiver UE 515 may be scheduled to receive the second set of packets prior to a second expiration time (e.g., time Y). For example, at least some of the packets of the second set of packets may expire (e.g., may be dropped) if those packets are not received by the second expiration time Y.

In some cases, the transmitter UE 505 may be configured to transmit the first set of packets to the first receiver UE 510, and the second set of packets to the second receiver UE 515, via unicast communications. Thus, the transmitter UE 505 may only be able to transmit a first packet (e.g., a packet of the first set of packets) or a second packet (e.g., a packet of the second set of packets) at a given time.

In some cases, the transmitter UE 505 may not be configured with the first expiration time and/or the second expiration time. For example, the transmitter UE 505 may not be able to determine the first expiration time X of the first set of packets, or the second expiration time Y of the second set of packets. Thus, the transmitter UE 505 may not be able to properly schedule transmissions between the first receiver UE 510 and the second receiver UE 515 in order to minimize the number of packets that are dropped. For example, the transmitter UE 505 may schedule a transmission of the first packet prior to a transmission of the second packet, even though the expiration time Y is before the expiration time X. As a result, it is possible that the second packet may expire before the transmitter UE 505 is able to transmit the second packet. Since the transmitter UE 505 is not configured with the packet expiry information, the transmitter UE 505 may not be able to determine an appropriate order for transmitting the packets, resulting in a greater likelihood of packet expiration.

Techniques and apparatuses are described herein for packet expiry information signaling for sidelink communications. In some aspects, a transmitter UE may obtain timing information that indicates an expiration time for transmitting a plurality of packets to a receiver UE. Obtaining the timing information may include receiving the timing information from the receiver UE, or receiving the timing information from a base station. The expiration time for transmitting the plurality of packets may include an average expiration time for transmitting the plurality of packets, a median expiration time for transmitting the plurality of packets, a maximum expiration time for transmitting the plurality of packets, or a minimum expiration time for transmitting the plurality of packets. The transmitter UE may be configured to transmit a packet, of the plurality of packets, to the receiver UE via a sidelink communication and in accordance with the timing information.

As described above, the transmitter UE may be configured to transmit packets to multiple receiver UEs. However, the transmitter UE may not be configured with information that enables the transmitter UE to determine timing information for transmitting the packets to the multiple receiver UEs, resulting in an increased likelihood of packet expiration. Enabling the transmitter UE to receive timing information for transmitting a plurality of packets, and to selectively transmit the packets in accordance with the timing information, as described herein, may decrease the likelihood of packet expiration, increase packet efficiency, reduce packet latency, and improve quality of service for data transmissions.

As indicated above, FIG. 5 is provided as an example. Other examples may differ from what is described with respect to FIG. 5.

Figure 6:
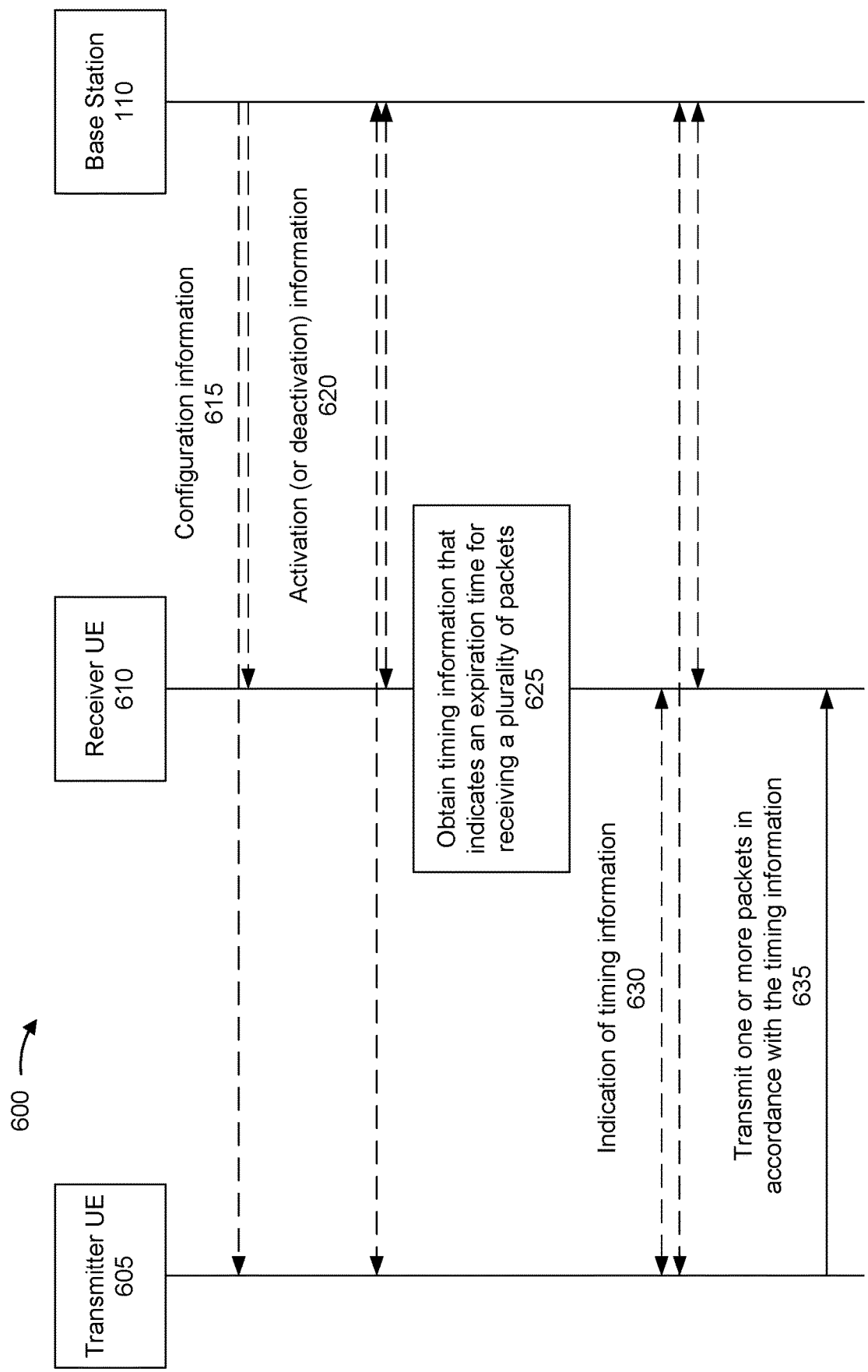
FIG. 6 is a diagram illustrating an example associated with packet expiry information signaling for sidelink communications, in accordance with the present disclosure.

FIG. 6 is a diagram illustrating an example 600 of packet expiry information signaling for sidelink communication, in accordance with the present disclosure. A transmitter UE, such as the transmitter UE 605, may communicate with a receiver UE, such as the receiver UE 610. In some aspects, the communications between the transmitter UE 605 and the receiver UE 610 may be sidelink communications. In some aspects, the communications between the transmitter UE 605 and the receiver UE 610 may be unicast communications. While the UEs are described as transmitter UEs and receiver UEs, any of the UEs described herein may be configured to transmit and receive information. For example, the transmitter UE 605 and/or the receiver UE 610 may include one or more features of the UE 120. The transmitter UE 605 and/or the receiver UE 610 may communicate with a base station, such as the base station 110.

In some aspects, the base station 110, the transmitter UE 605, and/or the receiver UE 610 may obtain timing information. As used herein, the term "obtain" may mean to receive, determine, or calculate, among other examples. For example, receiver UE 610 may be configured to obtain (e.g., determine or calculate) timing information for a plurality of packets, and the transmitter UE 605, or the base station 110, may be configured to obtain (e.g., receive) the timing information from the receiver UE 610.

As shown in connection with reference number 615, the base station 110 may transmit configuration information. For example, the base station 110 may transmit the configuration information to the transmitter UE 605 and/or the receiver UE 610. The configuration information may be communicated via an RRC message.

In some aspects, the configuration information may include configuration information for obtaining (e g, determining or calculating) timing information for a plurality of packets. As described in more detail below, the configuration information may include multiple options for obtaining the timing information for the plurality of packets, such as an average time to expiration, a median time to expiration, a minimum time to expiration, or a maximum time to expiration, among other examples. In some aspects, the base station 110 may transmit an indication, such as a medium access control (MAC) control element (CE) or DCI, that indicates for the transmitter UE 605 or the receiver UE 610 to switch between one or more of the options for obtaining the timing information.

In some aspects, the configuration information may include configuration information for communicating (e.g., transmitting or receiving) the timing information for the plurality of packets. As described in more detail below, the configuration information may include multiple options for communicating the timing information. For example, the configuration information may indicate to communicate the timing information via the PC5 interface, via the Uu interface, via periodic reporting, or via aperiodic reporting. In some aspects, the base station 110 may transmit an indication, such as a MAC-CE or DCI, that indicates for the transmitter UE 605 or the receiver UE 610 to switch between one or more of the options for communicating the timing information.

As shown in connection with reference number 620, the base station 110, the transmitter UE 605, or the receiver UE 610 may transmit activation information and/or deactivation information (collectively, the "activation information") for communicating the timing information for the plurality of packets. The activation information may be communicated via a MAC-CE, or via DCI, among other examples.

In some aspects, the base station 110 may transmit, and the transmitter UE 605 or the receiver UE 610 may receive, the activation information. The activation information may be communicated based at least in part on a capability of the transmitter UE 605, a capability of the receiver UE 610, a traffic QoS indicator, a channel condition, a strength of the Uu channel, or a strength of the PC5 channel, among other examples. In some aspects, the activation information may include an indication to activate or deactivate one or more of the options for communicating the timing information. For example, the activation information may include an indication to activate the periodic reporting of the timing information and/or to deactivate the aperiodic reporting of the timing information.

In some aspects, the transmitter UE 605 or the receiver UE 610 may transmit, and the base station 110, or the other of the transmitter UE 605 and the receiver UE 610, may receive, the activation information. The activation information may be communicated based at least in part on a capability of the transmitter UE 605, a capability of the receiver UE 610, a traffic quality of service indicator, a channel condition, a strength of the Uu channel, or a strength of the PC5 channel, among other examples. In some aspects, the activation information may include an indication to activate or deactivate one or more of the options for communicating the timing information. For example, the activation information may include an indication to activate the communicating of the timing information over the PC5 interface and/or to deactivate the communicating of the timing information over the Uu interface.

As shown in connection with reference number 625, the receiver UE 610 may obtain (e.g., determine or calculate) timing information that indicates an expiration time for a plurality of packets. For example, the receiver UE 610 may obtain timing information that indicates an expiration time for receiving the plurality of packets from the transmitter UE 605.

In some aspects, the expiration time for the plurality of packets may indicate an average expiration time for the plurality of packets, a median expiration time for the plurality of packets, a maximum expiration time for the plurality of packets, or a minimum expiration time for the plurality of packets, among other examples. In some aspects, the receiver UE 610 may be configured to calculate the average expiration time, the median expiration time, the maximum expiration time, or the minimum expiration time, for the plurality of packets. Additional details regarding the expiration time for the plurality of packets are described below in connection with FIG. 7.

As shown in connection with reference number 630, the transmitter UE 605, the receiver UE 610, and/or the base station 110 may communicate (e.g., transmit or receive) an indication of the timing information.

In some aspects, the timing information may be communicated via the PC5 interface. For example, the receiver UE 610 may be configured to transmit the indication of the timing information directly to the transmitter UE 605 via one or more sidelink communications (e.g., using the PC5 interface). Some examples are provided below.

In some aspects, the transmitter UE 605 may transmit, to the receiver UE 610, a "pull" request associated with the timing information. The pull request may be transmitted and received using a dedicated sidelink MAC-CE. The receiver UE 610 may transmit the indication of the timing information to the transmitter UE 605 in response to receiving the pull request.

In some aspects, the receiver UE 610 may transmit the indication of the timing information to the transmitter UE 605 periodically (e.g., according to a configured periodicity). For example, the receiver UE 610 may transmit the indication of the timing information to the transmitter UE 605 in accordance with a time interval, such as a configured time interval (e.g., every ten milliseconds).

In some aspects, the receiver UE 610 may transmit the indication of the timing information to the transmitter UE 605 via a sidelink MAC-CE.

In some aspects, the receiver UE 610 may transmit the indication of the timing information to the transmitter UE 605 via an existing sidelink feedback message, such as a dedicated sidelink feedback message. In some aspects, the dedicated sidelink feedback message may be included as part of a sidelink buffer status report.

In some aspects, the receiver UE 610 may transmit the indication of the timing information to the transmitter UE 605 based at least in part on the occurrence of a triggering event. The triggering event may include a change in the expiration time (e.g., the average expiration time) for the plurality of packets, or a change in the QoS requirement of the serving traffic, among other examples. In some aspects, the receiver UE 610 may transmit the indication of the timing information (e.g., aperiodically) in response to the occurrence of a triggering event. In some aspects, the transmitter UE 605 may transmit one or more packets using current timing information, or previous timing information, if the receiver UE 610 does not transmit the indication of the timing information in response to the occurrence of the triggering event.

In some aspects, the timing information may be communicated via the Uu interface. For example, the receiver UE 610 may transmit the indication of the timing information (using the Uu interface) to the base station 110. The base station 110 may transmit (e.g., relay) the indication of the timing information to the transmitter UE 605 (using the Uu interface). Some examples are provided below.

In some aspects, the receiver UE 610 may receive a pull request associated with the timing information. The pull request may be received from the base station 110. The base station 110 may be configured to transmit the pull request to the receiver UE 610 based at least in part on a request from the transmitter UE 605 for the base station 110 to pull the timing information from the receiver UE 610. In some aspects, the pull request may be received from the base station 110 via a MAC-CE. In some aspects, the pull request may be received from the base station 110 via uplink control information (UCI).

In some aspects, the receiver UE 610 may transmit the indication of the timing information to the base station 110 periodically (e.g., according to a configured periodicity). For example, the receiver UE 610 may transmit the indication of the timing information to the base station 110 in accordance with a time interval, such as a configured time interval (e.g., every ten milliseconds).

In some aspects, the receiver UE 610 may transmit the indication of the timing information to the base station 110 via a MAC-CE.

In some aspects, the receiver UE 610 may transmit the indication of the timing information to the base station 110 via UCI.

In some aspects, the receiver UE 610 may transmit the indication of the timing information to the base station 110 via an uplink feedback message. In some aspects, the uplink feedback message may be included as part of a buffer status report.

In some aspects, the receiver UE 610 may transmit the indication of the timing information to the base station 110 based at least in part on the occurrence of a triggering event. The triggering event may include a change in the expiration time (e.g., the average expiration time) for the plurality of packets, or a change in the QoS requirement of the serving traffic, among other examples. In some aspects, the receiver UE 610 may transmit the indication of the timing information (e.g., aperiodically) in response to the occurrence of a triggering event. In some aspects, the transmitter UE 605 may transmit one or more packets using current timing information, or previous timing information, if the transmitter UE 605 does not receive the indication of the timing information in response to the occurrence of the triggering event.

As described above, the receiver UE 610 may transmit the indication of the timing information to the base station 110. The base station 110 may receive the indication of the timing, and may transmit (e.g., relay) the indication of the timing information to the transmitter UE 605. In some aspects, the base station 110 may transmit the indication of the timing information to the transmitter UE 605 via a MAC-CE. In some aspects, the base station 110 may transmit the indication of the timing information to the transmitter UE 605 via DCI. In some aspects, the base station 110 may include the timing information when configuring (or updating) the sidelink grant for the transmitter UE 605.

As shown in connection with reference number 635, the transmitter UE 605 may transmit, and the receiver UE 610 may receive, one or more packets. The transmitter UE 605 may transmit the one or more packets in accordance with the timing information. The transmitter UE 605 may transmit the one or more packets via a unicast transmission.

In some aspects, the transmitter UE 605 may receive the indication of the timing information (e.g., via the PC5 or the Uu interface), and may transmit the one or more packets to the receiver UE 610 based at least in part on the timing information. As described above, the timing information may indicate an expiration time for a plurality of packets. For example, the expiration time may be an average expiration time, a median expiration time, a maximum expiration time, or a minimum expiration time, for the plurality of packets. The transmitter UE 605 may be configured to transmit one or more packets, of the plurality of packets, based at least in part on the expiration time. For example, the transmitter UE 605 may transmit the one or more packets prior to the average expiration time, the median expiration time, the maximum expiration time, or the minimum expiration time. Alternatively, the transmitter UE 605 may transmit the one or more packets such that the one or more packets are received, by the receiver UE 610, prior to the average expiration time, the median expiration time, the maximum expiration time, or the minimum expiration time.

In some aspects, the transmitter UE 605 may transmit the plurality of packets to multiple UEs, such as a first receiver UE 610-1 and a second receiver UE 610-2. For example, the transmitter UE 605 may be configured to transmit one or more first packets, of the plurality of packets, to the first receiver UE 610-1, and one or more second packets, of the plurality of packets (or of a different plurality of packets) to the second receiver UE 610-2. The transmitter UE 605 may be configured to determine an order, or a priority, for transmitting the first packets to the first receiver UE 610-1, and the second packets to the second receiver UE 610-2, based at least in part on the expiration times for the first packets and the second packets. For example, the transmitter UE 605 may receive an indication that the first packets will expire in three milliseconds, and an indication that the second packets will expire in five milliseconds. Thus, the transmitter UE 605 may transmit the first packets to the first receiver UE 610-1 prior to transmitting the second packets to the second receiver UE 610-2.

In some aspects, the transmitter UE 605 may determine one or more scheduling procedures for transmitting the one or more packets. The one or more scheduling procedures may be determined based at least in part on the timing information. In some aspects, the transmitter UE 605 may transmit the one or more packets proportionally. For example, the transmitter UE 605 may transmit the same (or approximately the same) number of packets to the first receiver UE 610-1 and the second receiver UE 610-2. In some aspects, the transmitter UE 605 may transmit the one or more packets using deadline aware scheduling. For example, the transmitter UE 605 may transmit the one or more packets to the first receiver UE 610-1 or the second receiver UE 610-2 according to the packet expiration times (e.g., according only to the packet expiration times). In some aspects, the transmitter UE 605 may transmit the one or more packets using a round robin scheduling. The round robin scheduling may be combined with one or more of the other scheduling procedures, such as the deadline aware scheduling.

As described above, a transmitter UE may be configured to transmit packets to multiple receiver UEs. However, the transmitter UE may not be configured with information that enables the transmitter UE to determine timing information for transmitting the packets to the multiple receiver UEs, resulting in an increased likelihood of packet expiration. Enabling the transmitter UE to receive timing information for transmitting a plurality of packets, and to selectively transmit the packets in accordance with the timing information, as described herein, may decrease the likelihood of packet expiration, and therefore, the number of packets that are dropped.

As indicated above, FIG. 6 is provided as an example. Other examples may differ from what is described with respect to FIG. 6.

Figure 7:
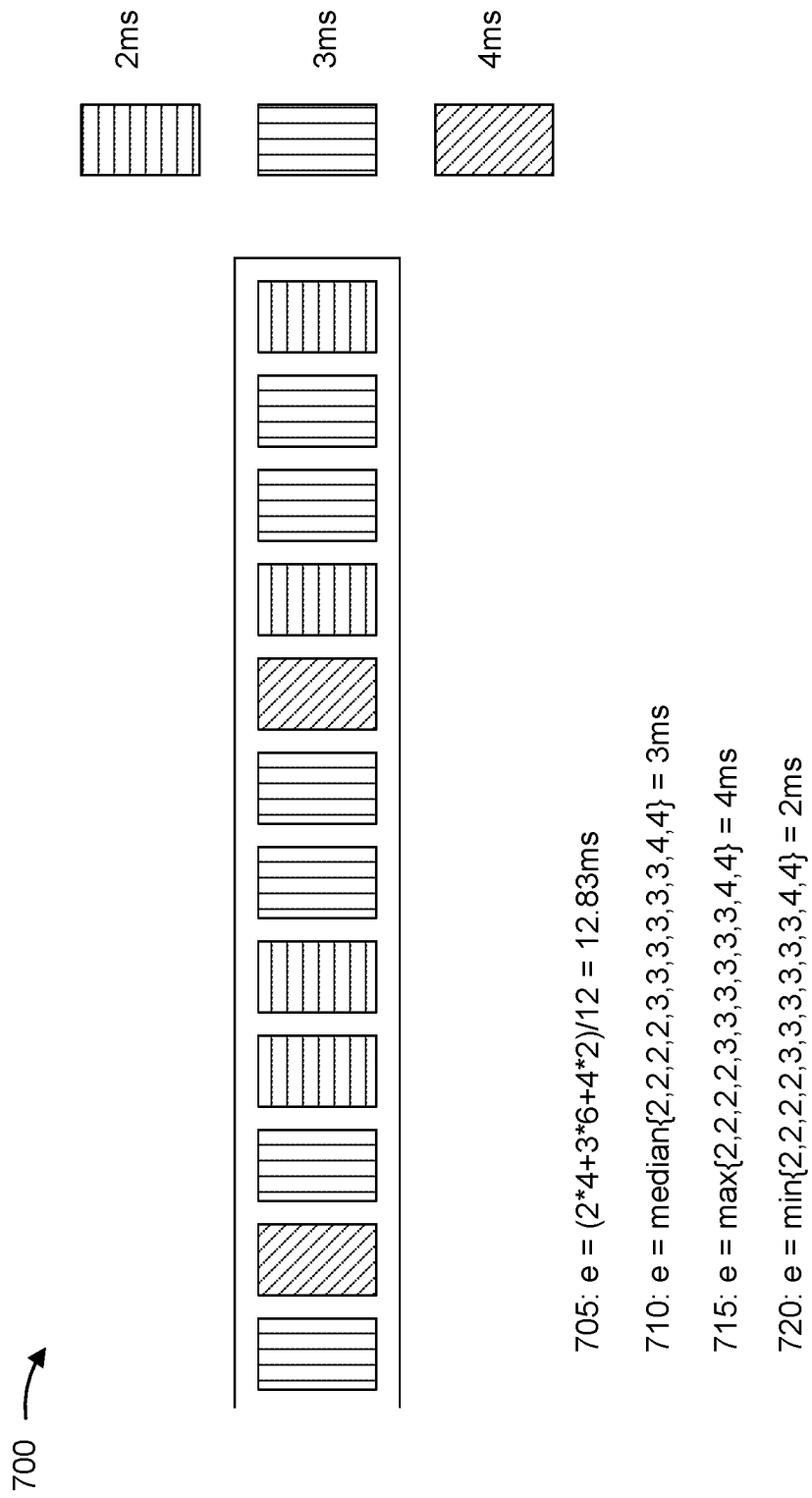
FIG. 7 is a diagram illustrating an example associated with packet expiration time calculation, in accordance with the present disclosure.

FIG. 7 is a diagram illustrating an example 700 of packet expiration time calculation, in accordance with the present disclosure.

As described above in connection with example 600, the receiver UE 610 may be configured to obtain (e.g., determine or calculate) timing information for a plurality of packets. The timing information may be associated with a time at which the plurality of packets will expire. For example, the timing information may correspond to an average time at which the plurality of packets will expire, a median time at which the plurality of packets will expire, a maximum time at which the plurality of packets will expire, or a minimum time at which the plurality of packets will expire. Example calculations for packet expiration are described below.

As shown in the example 700, the receiver UE 610 may be configured to receive a plurality of packets. The plurality of packets may include twelve packets, and each of the twelve packets may have an expiration time. For example, a first set of packets may have a first expiration time (e.g., 2 ms), a second set of packets may have a second expiration time (e.g., 3 ms), and a third set of packets may have a third expiration time (e.g., 4 ms). The expiration times of the plurality of packets may be as follows: 3 ms, 4 ms, 3 ms, 2 ms, 2 ms, 3 ms, 3 ms, 4 ms, 2 ms, 3 ms, 3 ms, 2 ms.

In a first example, as shown in connection with reference number 705, the receiver UE 610 may calculate an average expiration time for the plurality of packets. The average expiration time for the plurality of packets may be 2.83 ms. Thus, the receiver UE 610 may transmit an indication (e.g., to the transmitter UE 605 or the base station 110) that the receiver UE 610 needs to receive the plurality of packets in 2.83 ms (or less).

In a second example, as shown in connection with reference number 710, the receiver UE 610 may calculate a median expiration time for the plurality of packets. The median expiration time for the plurality of packets may be 3 ms. Thus, the receiver UE 610 may transmit an indication (e.g., to the transmitter UE 605 or the base station 110) that the receiver UE 610 needs to receive the plurality of packets in 3 ms (or less).

In a third example, as shown in connection with reference number 715, the receiver UE 610 may calculate a maximum expiration time for the plurality of packets. The maximum expiration time for the plurality of packets may be 4 ms. Thus, the receiver UE 610 may transmit an indication (e.g., to the transmitter UE 605 or the base station 110) that the receiver UE 610 needs to receive the plurality of packets in 4 ms (or less).

In a fourth example, as shown in connection with reference number 720, the receiver UE 610 may calculate a minimum expiration time for the plurality of packets. The minimum expiration time for the plurality of packets may be 2 ms. Thus, the receiver UE 610 may transmit an indication (e.g., to the transmitter UE 605 or the base station 110) that the receiver UE 610 needs to receive the plurality of packets in 2 ms (or less).

Although the packet expiration time is described herein as an average expiration time, a median expiration time, a maximum expiration time, or a minimum expiration time, these examples are provided solely for the purposes of explanation. The receiver UE 610 may be configured to calculate other packet expiration times, and to transmit the other packet expiration times to the transmitter UE 605 or the base station 110.

As indicated above, FIG. 7 is provided as an example. Other examples may differ from what is described with respect to FIG. 7.

Figure 8:
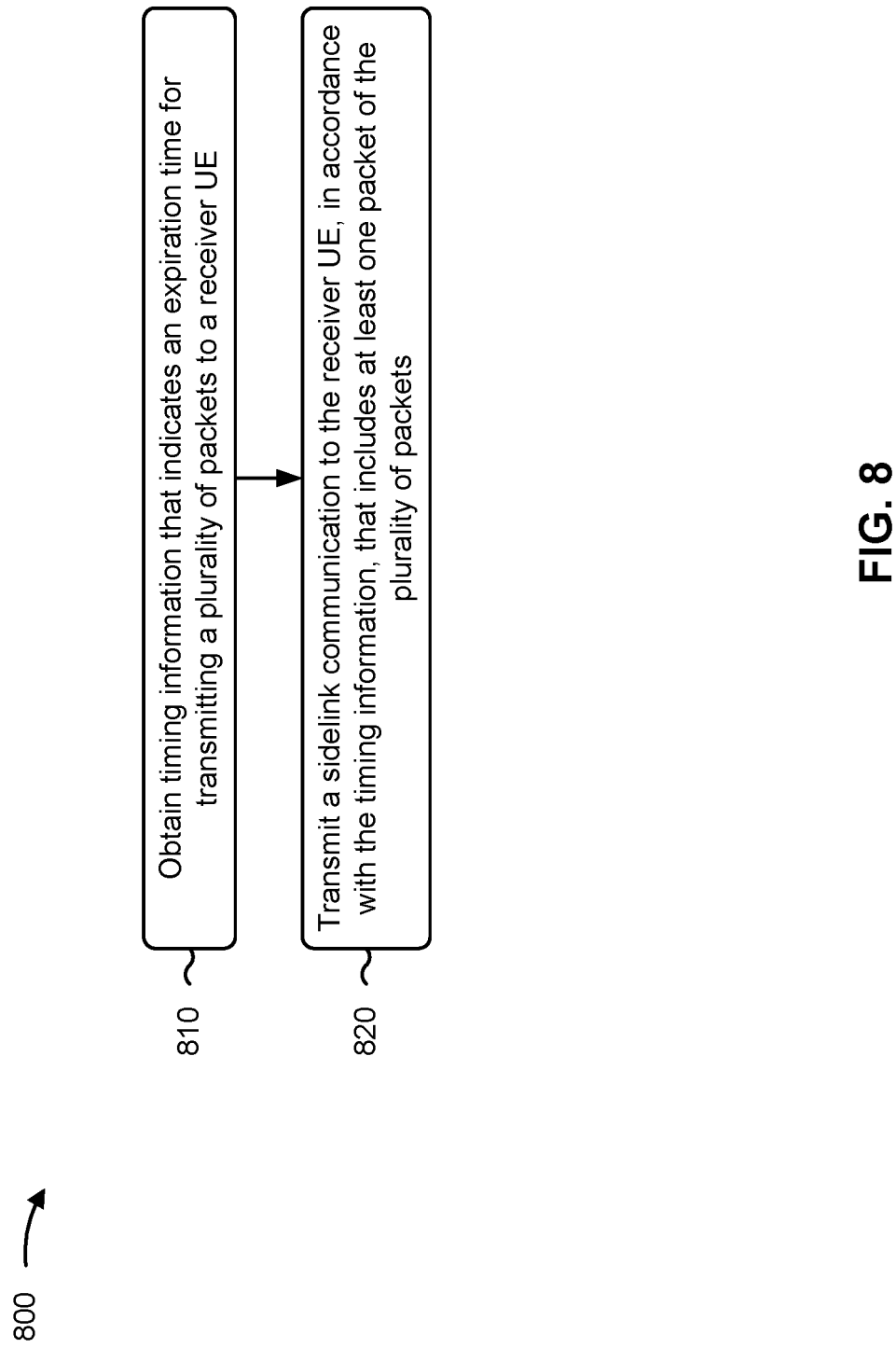
FIG. 8 is a diagram illustrating an example process associated with packet expiry information signaling for sidelink communications, in accordance with the present disclosure.

FIG. 8 is a diagram illustrating an example process 800 performed, for example, by a transmitter UE, in accordance with the present disclosure. Example process 800 is an example where the UE (e.g., UE 120) performs operations associated with packet expiry information signaling for sidelink communications.

As shown in FIG. 8, in some aspects, process 800 may include obtaining timing information that indicates an expiration time for transmitting a plurality of packets to a receiver UE (block 810). For example, the UE (e.g., using communication manager 140 and/or timing component 1008, depicted in FIG. 10) may obtain timing information that indicates an expiration time for transmitting a plurality of packets to a receiver UE, as described above.

As further shown in FIG. 8, in some aspects, process 800 may include transmitting a sidelink communication to the receiver UE, in accordance with the timing information, that includes at least one packet of the plurality of packets (block 820). For example, the UE (e.g., using communication manager 140 and/or transmission component 1004, depicted in FIG. 10) may transmit a sidelink communication to the receiver UE, in accordance with the timing information, that includes at least one packet of the plurality of packets, as described above.

Process 800 may include additional aspects, such as any single aspect or any combination of aspects described below and/or in connection with one or more other processes described elsewhere herein.

In a first aspect, obtaining the timing information comprises receiving the timing information from the receiver UE.

In a second aspect, alone or in combination with the first aspect, obtaining the timing information comprises pulling the timing information from the receiver UE.

In a third aspect, alone or in combination with one or more of the first and second aspects, obtaining the timing information comprises receiving the timing information from a base station.

In a fourth aspect, alone or in combination with one or more of the first through third aspects, process 800 includes transmitting, to the base station, a request for the base station to obtain the timing information from the receiver UE.

In a fifth aspect, alone or in combination with one or more of the first through fourth aspects, the expiration time for transmitting the plurality of packets includes an average expiration time for transmitting the plurality of packets, a median expiration time for transmitting the plurality of packets, a maximum expiration time for transmitting the plurality of packets, or a minimum expiration time for transmitting the plurality of packets.

In a sixth aspect, alone or in combination with one or more of the first through fifth aspects, obtaining the timing information comprises receiving the timing information periodically.

In a seventh aspect, alone or in combination with one or more of the first through sixth aspects, obtaining the timing information comprises receiving the timing information from the receiver UE via a sidelink medium access control message.

In an eighth aspect, alone or in combination with one or more of the first through seventh aspects, obtaining the timing information comprises receiving the timing information from a base station via a medium access control message or uplink control information.

In a ninth aspect, alone or in combination with one or more of the first through eighth aspects, obtaining the timing information comprises receiving the timing information from the receiver UE via a dedicated sidelink feedback message.

In a tenth aspect, alone or in combination with one or more of the first through ninth aspects, obtaining the timing information comprises receiving the timing information from the receiver UE via a sidelink buffer status report.

In an eleventh aspect, alone or in combination with one or more of the first through tenth aspects, obtaining the timing information comprises receiving the timing information based at least in part on an occurrence of a triggering event.

In a twelfth aspect, alone or in combination with one or more of the first through eleventh aspects, the triggering event includes an updated expiration time or a change in a quality of service indicator.

In a thirteenth aspect, alone or in combination with one or more of the first through twelfth aspects, obtaining the timing information comprises receiving the timing information, from the receiver UE via another sidelink communication, based at least in part on the occurrence of the triggering event.

In a fourteenth aspect, alone or in combination with one or more of the first through thirteenth aspects, obtaining the timing information comprises receiving the timing information, from a base station via a medium access control message or downlink control information, based at least in part on the occurrence of the triggering event.

In a fifteenth aspect, alone or in combination with one or more of the first through fourteenth aspects, obtaining the timing information comprises pulling the timing information from the receiver UE via a sidelink medium access control message.

In a sixteenth aspect, alone or in combination with one or more of the first through fifteenth aspects, obtaining the timing information comprises transmitting, to a base station, a medium access control message or uplink control information that indicates for the base station to pull the timing information from the receiver UE.

In a seventeenth aspect, alone or in combination with one or more of the first through sixteenth aspects, the sidelink communication is a unicast communication to the receiver UE.

In an eighteenth aspect, alone or in combination with one or more of the first through seventeenth aspects, process 800 includes obtaining other timing information that indicates an other expiration time for transmitting an other plurality of packets to another receiver UE, and transmitting a packet of the plurality of packets to the receiver UE, prior to transmitting a packet of the other plurality of packets to the other receiver UE, based at least in part on the timing information and the other timing information.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
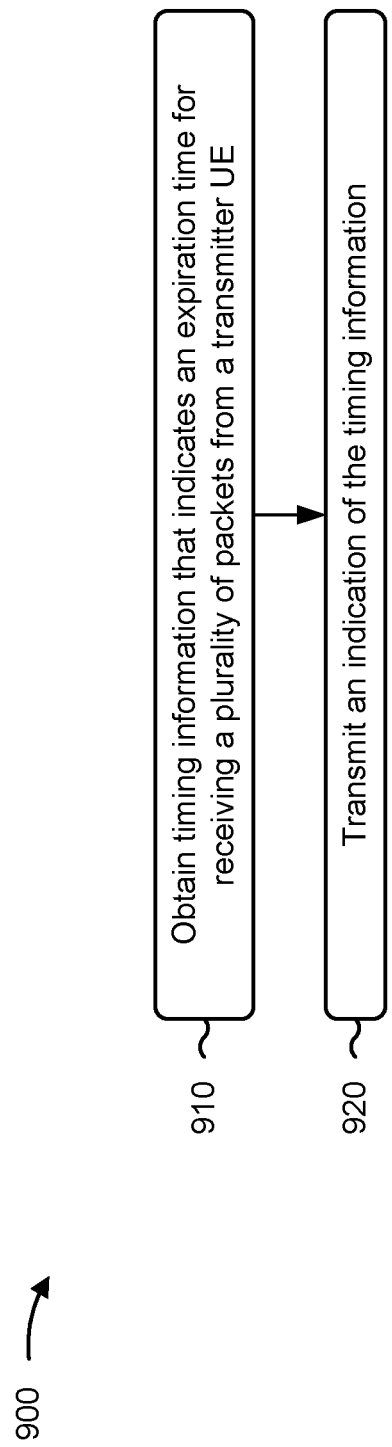
FIG. 9 is a diagram illustrating an example process associated with packet expiry information signaling for sidelink communications, in accordance with the present disclosure.

FIG. 9 is a diagram illustrating an example process 900 performed, for example, by a receiver UE, in accordance with the present disclosure. Example process 900 is an example where the UE (e.g., UE 120) performs operations associated with packet expiry information signaling for sidelink communications.

As shown in FIG. 9, in some aspects, process 900 may include obtaining timing information that indicates an expiration time for receiving a plurality of packets from a transmitter UE (block 910). For example, the UE (e.g., using communication manager 140 and/or timing component 1108, depicted in FIG. 11) may obtain timing information that indicates an expiration time for receiving a plurality of packets from a transmitter UE, as described above.

As further shown in FIG. 9, in some aspects, process 900 may include transmitting an indication of the timing information (block 920). For example, the UE (e.g., using communication manager 140 and/or transmission component 1104, depicted in FIG. 11) may transmit an indication of the timing information, as described above.

Process 900 may include additional aspects, such as any single aspect or any combination of aspects described below and/or in connection with one or more other processes described elsewhere herein.

In a first aspect, obtaining the timing information comprises calculating the expiration time for receiving the plurality of packets from the transmitter UE.

In a second aspect, alone or in combination with the first aspect, calculating the expiration time for receiving the plurality of packets from the transmitter UE comprises calculating an average expiration time for receiving the plurality of packets, a median expiration time for receiving the plurality of packets, a maximum expiration time for receiving the plurality of packets, or a minimum expiration time for receiving the plurality of packets.

In a third aspect, alone or in combination with one or more of the first and second aspects, transmitting the indication of the timing information comprises transmitting the timing information to the transmitter UE via a sidelink communication.

In a fourth aspect, alone or in combination with one or more of the first through third aspects, process 900 includes receiving, from the transmitter UE, a pull request associated with the timing information.

In a fifth aspect, alone or in combination with one or more of the first through fourth aspects, transmitting the indication of the timing information comprises transmitting the timing information to a base station.

In a sixth aspect, alone or in combination with one or more of the first through fifth aspects, process 900 includes receiving, from the base station, a pull request associated with the timing information.

In a seventh aspect, alone or in combination with one or more of the first through sixth aspects, transmitting the indication of the timing information comprises transmitting the timing information periodically.

In an eighth aspect, alone or in combination with one or more of the first through seventh aspects, transmitting the indication of the timing information comprises transmitting the timing information to the transmitter UE via a sidelink medium access control message.

In a ninth aspect, alone or in combination with one or more of the first through eighth aspects, transmitting the indication of the timing information comprises transmitting the timing information to a base station via a medium access control message or uplink control information.

In a tenth aspect, alone or in combination with one or more of the first through ninth aspects, transmitting the indication of the timing information comprises transmitting the timing information to the transmitter UE via a dedicated sidelink feedback message.

In an eleventh aspect, alone or in combination with one or more of the first through tenth aspects, transmitting the indication of the timing information comprises transmitting the timing information to the transmitter UE via a sidelink buffer status report.

In a twelfth aspect, alone or in combination with one or more of the first through eleventh aspects, transmitting the indication of the timing information comprises transmitting the timing information to a base station via an uplink feedback message.

In a thirteenth aspect, alone or in combination with one or more of the first through twelfth aspects, transmitting the indication of the timing information comprises transmitting the timing information to a base station via a buffer status report.

In a fourteenth aspect, alone or in combination with one or more of the first through thirteenth aspects, transmitting the indication of the timing information comprises transmitting the timing information based at least in part on an occurrence of a triggering event.

In a fifteenth aspect, alone or in combination with one or more of the first through fourteenth aspects, the triggering event includes an updated expiration time or a change in a quality of service indicator.

In a sixteenth aspect, alone or in combination with one or more of the first through fifteenth aspects, transmitting the indication of the timing information comprises transmitting a unicast communication that includes the indication of the timing information.

In a seventeenth aspect, alone or in combination with one or more of the first through sixteenth aspects, process 900 includes receiving, from a base station, configuration information associated with obtaining the timing information and transmitting the timing information.

In an eighteenth aspect, alone or in combination with one or more of the first through seventeenth aspects, the configuration information is received via a radio resource control message.

In a nineteenth aspect, alone or in combination with one or more of the first through eighteenth aspects, the configuration information indicates whether the receiver UE, or the base station, should transmit the timing information to the transmitter UE.

In a twentieth aspect, alone or in combination with one or more of the first through nineteenth aspects, process 900 includes receiving an indication to switch to the receiver UE or the base station for transmitting the timing information, wherein the indication to switch is received via a medium access control message or downlink control information.

In a twenty-first aspect, alone or in combination with one or more of the first through twentieth aspects, the configuration information indicates whether the timing information should be transmitted periodically or aperiodically.

In a twenty-second aspect, alone or in combination with one or more of the first through twenty-first aspects, process 900 includes receiving an indication to switch to transmitting the timing information periodically or aperiodically, wherein the indication is received via a medium access control message or downlink control information.

In a twenty-third aspect, alone or in combination with one or more of the first through twenty-second aspects, process 900 includes receiving an indication to activate or deactivate the transmitting of the timing information.

In a twenty-fourth aspect, alone or in combination with one or more of the first through twenty-third aspects, the indication to activate or deactivate the transmitting of the timing information is received based at least in part on a capability of the receiver UE, a quality of service indicator, or a channel condition.

In a twenty-fifth aspect, alone or in combination with one or more of the first through twenty-fourth aspects, process 900 includes transmitting an indication to activate or deactivate the transmitting of the timing information.

In a twenty-sixth aspect, alone or in combination with one or more of the first through twenty-fifth aspects, the indication to activate or deactivate the transmitting of the timing information is transmitted based at least in part on a capability of the receiver UE, a quality of service indicator, or a channel condition.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
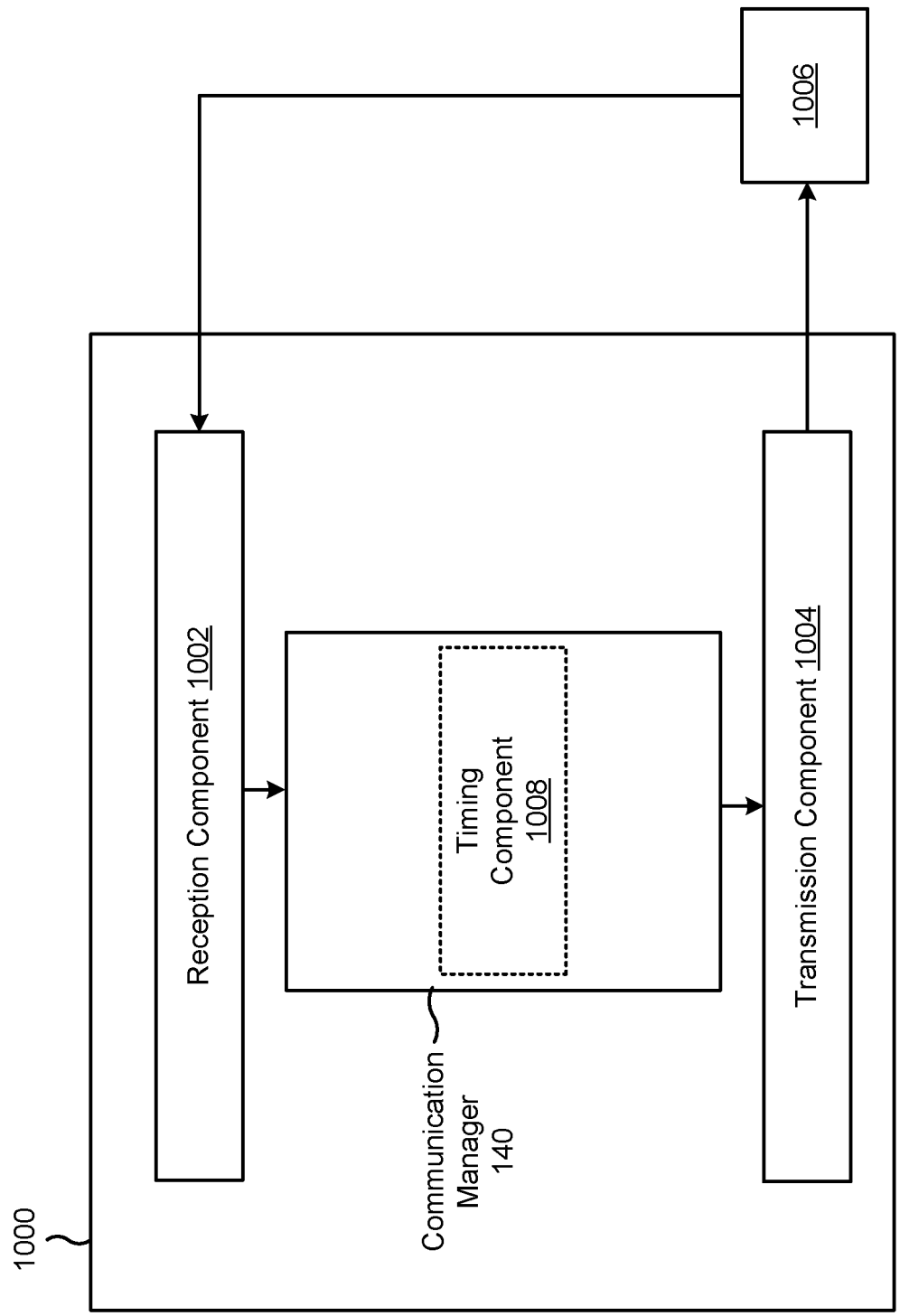
FIG. 10 is a diagram of an example apparatus for wireless communication, in accordance with the present disclosure.

FIG. 10 is a diagram of an example apparatus 1000 for wireless communication. The apparatus 1000 may be a transmitter UE, or a transmitter UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a timing component 1008, among other examples.

In some aspects, the apparatus 1000 may be configured to perform one or more operations described herein in connection with FIGS. 6-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the transmitter UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the transmitter UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the transmitter UE described in connection with FIG. 2. In some aspects, the transmission component 1004 may be co-located with the reception component 1002 in a transceiver.

The timing component 1008 may obtain timing information that indicates an expiration time for transmitting a plurality of packets to a receiver UE. The transmission component 1004 may transmit a sidelink communication to the receiver UE, in accordance with the timing information, that includes at least one packet of the plurality of packets.

The transmission component 1004 may transmit, to the base station, a request for the base station to obtain the timing information from the receiver UE.

The timing component 1008 may obtain other timing information that indicates an other expiration time for transmitting an other plurality of packets to an other receiver UE.

The transmission component 1004 may transmit a packet of the plurality of packets to the receiver UE, prior to transmitting a packet of the other plurality of packets to the other receiver UE, based at least in part on the timing information and the other timing information.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
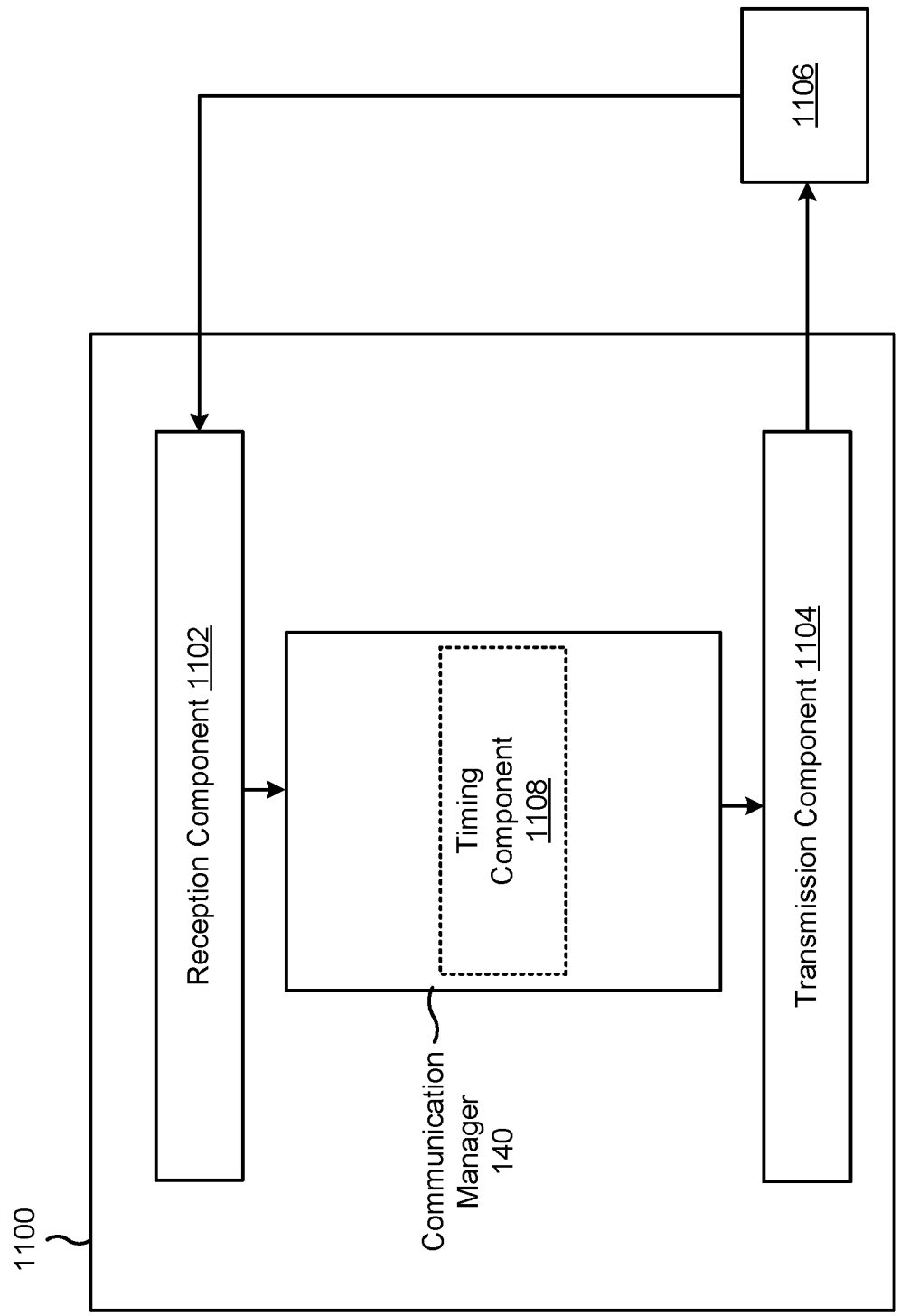
FIG. 11 is a diagram of an example apparatus for wireless communication, in accordance with the present disclosure.

FIG. 11 is a diagram of an example apparatus 1100 for wireless communication. The apparatus 1100 may be a receiver UE, or a receiver UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of a timing component 1108, among other examples.

In some aspects, the apparatus 1100 may be configured to perform one or more operations described herein in connection with FIGS. 6-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the receiver UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the receiver UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the receiver UE described in connection with FIG. 2. In some aspects, the transmission component 1104 may be co-located with the reception component 1102 in a transceiver.

The timing component 1108 may obtain timing information that indicates an expiration time for receiving a plurality of packets from a transmitter UE. The transmission component 1104 may transmit an indication of the timing information.

The reception component 1102 may receive, from the transmitter UE, a pull request associated with the timing information.

The reception component 1102 may receive, from the base station, a pull request associated with the timing information.

The reception component 1102 may receive, from a base station, configuration information associated with obtaining the timing information and transmitting the timing information.

The reception component 1102 may receive an indication to switch to the receiver UE or the base station for transmitting the timing information, wherein the indication to switch is received via a medium access control message or downlink control information.

The reception component 1102 may receive an indication to switch to transmitting the timing information periodically or aperiodically, wherein the indication is received via a medium access control message or downlink control information.

The reception component 1102 may receive an indication to activate or deactivate the transmitting of the timing information.

The transmission component 1104 may transmit an indication to activate or deactivate the transmitting of the timing information.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a transmitter user equipment (UE), comprising: obtaining timing information that indicates an expiration time for transmitting a plurality of packets to a receiver UE; and transmitting a sidelink communication to the receiver UE, in accordance with the timing information, that includes at least one packet of the plurality of packets.

Aspect 2: The method of Aspect 1, wherein obtaining the timing information comprises receiving the timing information from the receiver UE.

Aspect 3: The method of any of Aspects 1-2, wherein obtaining the timing information comprises pulling the timing information from the receiver UE.

Aspect 4: The method of any of Aspects 1-3, wherein obtaining the timing information comprises receiving the timing information from a base station.

Aspect 5: The method of Aspect 4, further comprising transmitting, to the base station, a request for the base station to obtain the timing information from the receiver UE.

Aspect 6: The method of any of Aspects 1-5, wherein the expiration time for transmitting the plurality of packets includes an average expiration time for transmitting the plurality of packets, a median expiration time for transmitting the plurality of packets, a maximum expiration time for transmitting the plurality of packets, or a minimum expiration time for transmitting the plurality of packets.

Aspect 7: The method of any of Aspects 1-6, wherein obtaining the timing information comprises receiving the timing information periodically.

Aspect 8: The method of any of Aspects 1-7, wherein obtaining the timing information comprises receiving the timing information from the receiver UE via a sidelink medium access control message.

Aspect 9: The method of any of Aspects 1-8, wherein obtaining the timing information comprises receiving the timing information from a base station via a medium access control message or uplink control information.

Aspect 10: The method of any of Aspects 1-9, wherein obtaining the timing information comprises receiving the timing information from the receiver UE via a dedicated sidelink feedback message.

Aspect 11: The method of any of Aspects 1-10, wherein obtaining the timing information comprises receiving the timing information from the receiver UE via a sidelink buffer status report.

Aspect 12: The method of any of Aspects 1-11, wherein obtaining the timing information comprises receiving the timing information based at least in part on an occurrence of a triggering event.

Aspect 13: The method of Aspect 12, wherein the triggering event includes an updated expiration time or a change in a quality of service indicator.

Aspect 14: The method of Aspect 12, wherein obtaining the timing information comprises receiving the timing information, from the receiver UE via another sidelink communication, based at least in part on the occurrence of the triggering event.

Aspect 15: The method of Aspect 12, wherein obtaining the timing information comprises receiving the timing information, from a base station via a medium access control message or downlink control information, based at least in part on the occurrence of the triggering event.

Aspect 16: The method of any of Aspects 1-15, wherein obtaining the timing information comprises pulling the timing information from the receiver UE via a sidelink medium access control message.

Aspect 17: The method of any of Aspects 1-16, wherein obtaining the timing information comprises transmitting, to a base station, a medium access control message or uplink control information that indicates for the base station to pull the timing information from the receiver UE.

Aspect 18: The method of any of Aspects 1-17, wherein the sidelink communication is a unicast communication to the receiver UE.

Aspect 19: The method of any of Aspects 1-18, further comprising: obtaining other timing information that indicates an other expiration time for transmitting an other plurality of packets to an other receiver UE; and transmitting a packet of the plurality of packets to the receiver UE, prior to transmitting a packet of the other plurality of packets to the other receiver UE, based at least in part on the timing information and the other timing information.

Aspect 20: A method of wireless communication performed by a receiver user equipment (UE), comprising: obtaining timing information that indicates an expiration time for receiving a plurality of packets from a transmitter UE; and transmitting an indication of the timing information.

Aspect 21: The method of Aspect 20, wherein obtaining the timing information comprises calculating the expiration time for receiving the plurality of packets from the transmitter UE.

Aspect 22: The method of Aspect 21, wherein calculating the expiration time for receiving the plurality of packets from the transmitter UE comprises calculating an average expiration time for receiving the plurality of packets, a median expiration time for receiving the plurality of packets, a maximum expiration time for receiving the plurality of packets, or a minimum expiration time for receiving the plurality of packets.

Aspect 23: The method of any of Aspects 20-22, wherein transmitting the indication of the timing information comprises transmitting the timing information to the transmitter UE via a sidelink communication.

Aspect 24: The method of Aspect 23, further comprising receiving, from the transmitter UE, a pull request associated with the timing information.

Aspect 25: The method of any of Aspects 20-24, wherein transmitting the indication of the timing information comprises transmitting the timing information to a base station.

Aspect 26: The method of Aspect 25, further comprising receiving, from the base station, a pull request associated with the timing information.

Aspect 27: The method of any of Aspects 20-26, wherein transmitting the indication of the timing information comprises transmitting the timing information periodically.

Aspect 28: The method of any of Aspects 20-27, wherein transmitting the indication of the timing information comprises transmitting the timing information to the transmitter UE via a sidelink medium access control message.

Aspect 29: The method of any of Aspects 20-28, wherein transmitting the indication of the timing information comprises transmitting the timing information to a base station via a medium access control message or uplink control information.

Aspect 30: The method of any of Aspects 20-29, wherein transmitting the indication of the timing information comprises transmitting the timing information to the transmitter UE via a dedicated sidelink feedback message.

Aspect 31: The method of any of Aspects 20-30, wherein transmitting the indication of the timing information comprises transmitting the timing information to the transmitter UE via a sidelink buffer status report.

Aspect 32: The method of any of Aspects 20-31, wherein transmitting the indication of the timing information comprises transmitting the timing information to a base station via an uplink feedback message.

Aspect 33: The method of any of Aspects 20-32, wherein transmitting the indication of the timing information comprises transmitting the timing information to a base station via a buffer status report.

Aspect 34: The method of any of Aspects 20-33, wherein transmitting the indication of the timing information comprises transmitting the timing information based at least in part on an occurrence of a triggering event.

Aspect 35: The method of Aspect 34, wherein the triggering event includes an updated expiration time or a change in a quality of service indicator.

Aspect 36: The method of any of Aspects 20-35, wherein transmitting the indication of the timing information comprises transmitting a unicast communication that includes the indication of the timing information.

Aspect 37: The method of any of Aspects 20-36, further comprising receiving, from a base station, configuration information associated with obtaining the timing information and transmitting the timing information.

Aspect 38: The method of Aspect 37, wherein the configuration information is received via a radio resource control message.

Aspect 39: The method of Aspect 37, wherein the configuration information indicates whether the receiver UE, or the base station, should transmit the timing information to the transmitter UE.

Aspect 40: The method of Aspect 39, further comprising receiving an indication to switch to the receiver UE or the base station for transmitting the timing information, wherein the indication to switch is received via a medium access control message or downlink control information.

Aspect 41: The method of Aspect 37, wherein the configuration information indicates whether the timing information should be transmitted periodically or aperiodically.

Aspect 42: The method of Aspect 41, further comprising receiving an indication to switch to transmitting the timing information periodically or aperiodically, wherein the indication is received via a medium access control message or downlink control information.

Aspect 43: The method of any of Aspects 20-42, further comprising receiving an indication to activate or deactivate the transmitting of the timing information.

Aspect 44: The method of Aspect 43, wherein the indication to activate or deactivate the transmitting of the timing information is received based at least in part on a capability of the receiver UE, a quality of service indicator, or a channel condition.

Aspect 45: The method of any of Aspects 20-44, further comprising transmitting an indication to activate or deactivate the transmitting of the timing information.

Aspect 46: The method of Aspect 45, wherein the indication to activate or deactivate the transmitting of the timing information is transmitted based at least in part on a capability of the receiver UE, a quality of service indicator, or a channel condition.

Aspect 47: An apparatus for wireless communication at a device, comprising a processor; memory coupled with the processor; and instructions stored in the memory and executable by the processor to cause the apparatus to perform the method of one or more of Aspects 1-19.

Aspect 48: A device for wireless communication, comprising a memory and one or more processors coupled to the memory, the one or more processors configured to perform the method of one or more of Aspects 1-19.

Aspect 49: An apparatus for wireless communication, comprising at least one means for performing the method of one or more of Aspects 1-19.

Aspect 50: A non-transitory computer-readable medium storing code for wireless communication, the code comprising instructions executable by a processor to perform the method of one or more of Aspects 1-19.

Aspect 51: A non-transitory computer-readable medium storing a set of instructions for wireless communication, the set of instructions comprising one or more instructions that, when executed by one or more processors of a device, cause the device to perform the method of one or more of Aspects 1-10.

Aspect 52: An apparatus for wireless communication at a device, comprising a processor; memory coupled with the processor; and instructions stored in the memory and executable by the processor to cause the apparatus to perform the method of one or more of Aspects 20-46.

Aspect 53: A device for wireless communication, comprising a memory and one or more processors coupled to the memory, the one or more processors configured to perform the method of one or more of Aspects 20-46.

Aspect 54: An apparatus for wireless communication, comprising at least one means for performing the method of one or more of Aspects 20-46.

Aspect 55: A non-transitory computer-readable medium storing code for wireless communication, the code comprising instructions executable by a processor to perform the method of one or more of Aspects 20-46.

Aspect 56: A non-transitory computer-readable medium storing a set of instructions for wireless communication, the set of instructions comprising one or more instructions that, when executed by one or more processors of a device, cause the device to perform the method of one or more of Aspects 20-46.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a transmitter user equipment (UE), comprising:
   obtaining timing information that indicates an expiration time for transmitting a plurality of packets to a receiver UE, wherein the expiration time is based at least in part on:
      a first expiration time associated with a first packet of the plurality of packets, and
      a second expiration time associated with a second packet of the plurality of packets; and
   transmitting a sidelink communication to the receiver UE, in accordance with the timing information, that includes the first packet of the plurality of packets.

2. The method of claim 1, wherein obtaining the timing information comprises receiving the timing information from the receiver UE.

3. The method of claim 1, wherein obtaining the timing information comprises receiving the timing information from a base station.

4. The method of claim 3, further comprising transmitting, to the base station, a request for the base station to obtain the timing information from the receiver UE.

5. The method of claim 1, wherein the expiration time for transmitting the plurality of packets is based at least in part on:
   an average expiration time for transmitting the plurality of packets,
   a median expiration time for transmitting the plurality of packets,
   a maximum expiration time for transmitting the plurality of packets, or a minimum expiration time for transmitting the plurality of packets.

6. The method of claim 1, wherein obtaining the timing information comprises receiving the timing information from the receiver UE via a sidelink medium access control message, a dedicated sidelink feedback message, or a sidelink buffer status report.

7. The method of claim 1, wherein obtaining the timing information comprises receiving the timing information from a base station via a medium access control message or uplink control information.

8. The method of claim 1, wherein obtaining the timing information comprises receiving the timing information based at least in part on an occurrence of a triggering event, wherein the triggering event includes an updated expiration time or a change in a quality of service indicator.

9. The method of claim 8, wherein obtaining the timing information comprises receiving the timing information, from the receiver UE via another sidelink communication, based at least in part on the occurrence of the triggering event.

10. The method of claim 8, wherein obtaining the timing information comprises receiving the timing information, from a base station via a medium access control message or downlink control information, based at least in part on the occurrence of the triggering event.

11. The method of claim 1, wherein obtaining the timing information comprises transmitting, to a base station, a medium access control message or uplink control information that indicates for the base station to pull the timing information from the receiver UE.

12. The method of claim 1, further comprising:
obtaining other timing information that indicates an other expiration time for transmitting an other plurality of packets to an other receiver UE; and
transmitting a packet of the plurality of packets to the receiver UE, prior to transmitting a packet of the other plurality of packets to the other receiver UE, based at least in part on the timing information and the other timing information.

13. A method of wireless communication performed by a receiver user equipment (UE), comprising:
obtaining timing information that indicates an expiration time for receiving a plurality of packets from a transmitter UE, wherein the expiration time is based at least in part on:
a first expiration time associated with a first packet of the plurality of packets, and
a second expiration time associated with a second packet of the plurality of packets; and
transmitting an indication of the timing information.

14. The method of claim 13, wherein obtaining the timing information comprises calculating the expiration time for receiving the plurality of packets from the transmitter UE.

15. The method of claim 14, wherein calculating the expiration time for receiving the plurality of packets from the transmitter UE comprises calculating:
an average expiration time for receiving the plurality of packets,
a median expiration time for receiving the plurality of packets,
a maximum expiration time for receiving the plurality of packets, or
a minimum expiration time for receiving the plurality of packets.

16. The method of claim 13, wherein transmitting the indication of the timing information comprises transmitting the timing information to the transmitter UE via a sidelink communication.

17. The method of claim 13, wherein transmitting the indication of the timing information comprises transmitting the timing information to a base station.

18. The method of claim 13, wherein transmitting the indication of the timing information comprises transmitting the timing information to the transmitter UE via a sidelink medium access control message, a dedicated sidelink feedback message, or a sidelink buffer status report.

19. The method of claim 13, wherein transmitting the indication of the timing information comprises transmitting the timing information to a base station via a medium access control message or uplink control information.

20. The method of claim 13, wherein transmitting the indication of the timing information comprises transmitting the timing information to a base station via an uplink feedback message or a buffer status report.

21. The method of claim 13, wherein transmitting the indication of the timing information comprises transmitting the timing information based at least in part on an occurrence of a triggering event, wherein the triggering event includes an updated expiration time or a change in a quality of service indicator.

22. The method of claim 13, wherein transmitting the indication of the timing information comprises transmitting a unicast communication that includes the indication of the timing information.

23. The method of claim 13, further comprising receiving, from a base station, configuration information associated with obtaining the timing information and transmitting the timing information.

24. The method of claim 23, wherein the configuration information indicates whether the receiver UE, or the base station, should transmit the timing information to the transmitter UE.

25. The method of claim 24, further comprising receiving an indication to switch to the receiver UE or the base station for transmitting the timing information, wherein the indication to switch is received via a medium access control message or downlink control information.

26. The method of claim 13, further comprising receiving an indication to activate or deactivate the transmitting of the timing information, wherein the indication to activate or deactivate the transmitting of the timing information is received based at least in part on a capability of the receiver UE, a quality of service indicator, or a channel condition.

27. The method of claim 13, further comprising transmitting an indication to activate or deactivate the transmitting of the timing information.

28. The method of claim 27, wherein the indication to activate or deactivate the transmitting of the timing information is transmitted based at least in part on a capability of the receiver UE, a quality of service indicator, or a channel condition.

29. An apparatus for wireless communication at a transmitter user equipment (UE), comprising:
one or more memories; and
one or more processors, coupled to the one or more memories, which are configured, individually or in any combination, to:
obtain timing information that indicates an expiration time for transmitting a plurality of packets to a receiver UE, wherein the expiration time is based at least in part on:

a first expiration time associated with a first packet of the plurality of packets, and a second expiration time associated with a second packet of the plurality of packets; and transmit a sidelink communication to the receiver UE, in accordance with the timing information, that includes at least one packet of the plurality of packets.

30. An apparatus for wireless communication at a receiver user equipment (UE), comprising:

one or more memories; and one or more processors, coupled to the one or more memories, which are configured, individually or in any combination, to:

obtain timing information that indicates an expiration time for receiving a plurality of packets from a transmitter UE, wherein the expiration time is based at least in part on:

a first expiration time associated with a first packet of the plurality of packets, and a second expiration time associated with a second packet of the plurality of packets; and transmit an indication of the timing information.

* * * * *